US008781708B2

(12) United States Patent
Wurts et al.

(10) Patent No.: US 8,781,708 B2
(45) Date of Patent: Jul. 15, 2014

(54) SYSTEMS, DEVICES AND METHODS FOR DETECTING ENGINE IDLING AND REPORTING SAME

(75) Inventors: Jay Wurts, Concord, MA (US); Richard Kumpf, Medfield, MA (US); Gerry Tammi, Hopkinton, MA (US)

(73) Assignee: Synovia Solutions, LLC, Indianapolis, IN (US)

( * ) Notice: Subject to any disclaimer, the term of this patent is extended or adjusted under 35 U.S.C. 154(b) by 87 days.

(21) Appl. No.: 13/432,774

(22) Filed: Mar. 28, 2012

(65) Prior Publication Data

US 2012/0316747 A1 Dec. 13, 2012

Related U.S. Application Data

(60) Provisional application No. 61/468,402, filed on Mar. 28, 2011.

(51) Int. Cl.
*G06F 19/00* (2011.01)

(52) U.S. Cl.
USPC .......... 701/99

(58) Field of Classification Search
USPC .......... 701/99-101, 36, 29.1
See application file for complete search history.

(56) References Cited

U.S. PATENT DOCUMENTS

| | | | | |
|---|---|---|---|---|
| 5,072,703 | A | 12/1991 | Sutton | |
| 5,509,302 | A * | 4/1996 | Drexel et al. | 73/114.05 |
| 5,577,475 | A * | 11/1996 | De Backer et al. | 123/479 |
| 6,775,602 | B2 * | 8/2004 | Gordon et al. | 701/29.6 |
| 2002/0033157 | A1 | 3/2002 | Thompson et al. | |
| 2005/0174217 | A1 * | 8/2005 | Basir et al. | 340/425.5 |
| 2010/0242906 | A1 | 9/2010 | Konezny | |
| 2012/0253548 | A1 * | 10/2012 | Davidson | 701/1 |

FOREIGN PATENT DOCUMENTS

KR 10-1997-0044756 7/1997

OTHER PUBLICATIONS

International Search Report mailed Oct. 10, 2012 for PCT/US2012/030910.

* cited by examiner

*Primary Examiner* — Yonel Beaulieu
(74) *Attorney, Agent, or Firm* — Woodard, Emhardt, Moriarty, McNett & Henry LLP

(57) ABSTRACT

Featured is an accurate and inexpensive system to detect and report engine idling in a vehicle including a detection portion and a reporting portion. The detection portion detects or senses the presence of voltage from the vehicle's ignition switch and vehicle's mechanical vibration from the running engine. The detection portion also can filter out transient vibrations which are not related to engine running. The detection portion forwards signal or information relating to engine running and vehicle movement to a reporting portion of the system. The reporting portion (e.g., a software application being executed on a computer or microprocessor) determines from the forwarded information if the vehicle engine is idling and if there is excessive idling. The fleet operator can define recommended maximum idling parameters to determine such excessive idling. Also featured are apparatuses, devices and methods related thereto.

17 Claims, 8 Drawing Sheets

NOTES: ONLY ACTIVE WHEN IGN IS ON

–

UNIT WILL OUTPUT HIGH FOR 30 SECONDS IF THE ENGINE IS NOT RUNNING

–

LOW OUTPUT INDICATES ENGINE NOT RUNNING
HIGH OUTPUT INDICATES ENGINE RUNNING

–

CONN2--3 IS CONNECTED TO BUS IGNITION SOLENOID CONTROL LINE
CONN2--2 (OUTPUT) CONNECTED TO UNIT IGNITION INPUT SENSOR
CONN2--1 IS CONNECTED TO VEHICLE CHASSIS

SYSTEMS, DEVICES AND METHODS FOR DETECTING ENGINE IDLING AND REPORTING SAME

This application claims the benefit of U.S. Provisional Application Ser. No. 61/468,402 filed Mar. 28, 2011, the teachings of which are incorporated herein by reference in their entirety.

FIELD OF INVENTION

The present invention relates to systems, device and methods for detecting engine idling and for reporting same and more particularly to such systems and methods which utilizes different inputs (e.g., two different inputs) in determining engine idling and more specifically where one of the inputs is determined from sensing a vehicle's mechanical vibration from the running engine.

BACKGROUND OF THE INVENTION

Efficient management of a vehicle fleet typically requires fleet operators to minimize fuel consumption and engine emissions. In particular, as a number of states, cities or other governmental bodies have enacted rules that are intended to limit or restrict idling of vehicles (such as trucks and buses, or vehicles powered by diesel engines) to reduce vehicle emissions. Thus, drivers of the vehicles are instructed (e.g., by posted signs, instructions from fleet or business operators) to minimize excessive engine idling between operations. It is not uncommon, however, to see drivers violate the mandates for minimizing undesirable engine idling. Therefore systems have been developed to monitor idling and thus monitor driver compliance to idling standards.

It is desirable to accurately report idling of a vehicle, while at the same time, minimizing the hardware costs of providing this information to the reporting system. Conventional systems generally fall into one of two categories, (i) an inexpensive and inaccurate method to report idling, or (ii) an expensive and accurate method to report idling.

As example of an inaccurate and inexpensive system, such a system monitors only the operational status of the Ignition-On switch. In such a system, however, if the ignition switch is turned ON and the engine is not running, false idling will be reported. For example, the vehicle operator may turn the ignition switch on so that certain electrical equipment may remain operational or functional.

As an example of a more-accurate and moderately expensive system, such a system monitors both the Ignition-On switch and the battery voltage changes during battery charging cycles. In such a system, if the vehicle's battery is nearing end of life, the detection of the charging voltage change can be inaccurate.

As an example of an accurate and expensive system, such a system monitors the engine's ECU (Engine Control Unit) for engine RPMs. This solution is very expensive to purchase and install. In addition, this solution is also limited to vehicles which have an available ECU connection.

It thus would be desirable to provide a new system, apparatus and device for monitoring the idling status of a vehicle and for reporting such idling status along with methods related thereto. It would be particularly desirable to provide such methods, systems, apparatuses and devices that would be both inexpensive and accurate as to idling detection and reporting in comparison to prior art devices/methods. Such methods, systems, apparatuses and devices preferably would be such that they can be easily adapted for use in new or existing installations as well as not being limited to vehicle engines.

SUMMARY OF THE INVENTION

The present invention features a system that is an accurate and inexpensive system to detect and report engine idling in a vehicle and includes a detection portion and a reporting portion. The detection portion detects or senses the presence of voltage from the vehicle's ignition switch and a vehicle's mechanical vibration from the running engine. The detection portion is preferably configured to also can filter out transient vibrations which are not related to engine running.

The detection portion forwards signal(s) or information relating to engine running and vehicle movement to a reporting portion of the system. The reporting portion (e.g., a software application being executed on a computer or microprocessor) determines from the forwarded information if the vehicle engine is idling and if there is excessive idling. The fleet operator can define recommended maximum idling parameters to determine such excessive idling. Also featured are apparatuses, devices and methods related thereto.

According to one aspect of the present invention, there is featured a system to detect and report engine idling in a vehicle. Such a system includes a detection portion and a reporting portion. The detection portion is configured so as to detect one or more, preferably two parameters associated with engine running, where one of the parameters being detected is a mechanical characteristic that is present when an the engine is running or operational and is not present when the engine is not running. The reporting portion is configured so as to determine from the one or more, a plurality or two detected parameters if the vehicle engine is idling.

In embodiments of the present invention, the mechanical characteristic being detected is a mechanical vibration and the other characteristic being detected is presence of voltage from the vehicle's ignition switch (i.e., indication that the ignition switch is in ON position).

In further embodiments, the detection portion is further configured so as to filter out vibrations not related to engine running. For example, the filter is configured so as to filter out vibrations at frequencies not associated with vibration of an operational engine or to only pass frequencies associated with vibration of an operational engine.

In yet further embodiments, the system further includes a vehicle movement portion that provides vehicle location information to the reporting portion so that the reporting portion can determine, such as from GPS location information, if the vehicle is moving or not moving.

In yet further embodiments, the reporting portion includes a computer and a software application program for execution on the computer, wherein the applications program includes instructions and criteria for determining if the vehicle is moving or not moving and if it is determined that the vehicle is not moving to determine if the vehicle's engine is idling. In addition, the software application program for execution on the computer, further includes instructions and criteria for specifying one or maximum idling parameters and for determining if the vehicle's engine is idling for more than a predetermined amount of time based on the specified one or more idling parameters.

In yet further embodiments, the detection portion includes a vibration sensor for sensing vehicle vibration. In addition, the detection portion can further include timing circuitry that is configured so as determine if the vibrations are continuous for at least a predetermined time.

According to another aspect of the present invention, there is featured an apparatus for determining if an engine of a vehicle is running. Such an apparatus includes a detection portion that is configured so as to detect parameters (e.g., a plurality of parameters) associated with engine running. Where one of the parameters being detected is a mechanical characteristic that is present when the engine is running and is not present.

In embodiments of the present invention, the mechanical characteristic being detected is a mechanical vibration and the other characteristic being detected is presence of voltage from the vehicle's ignition switch. In yet further embodiments, the detection portion is further configured so as to filter out vibrations not related to engine running.

In yet further embodiments of the present invention, the detection and/or reporting portion comprises a microprocessor an applications program for execution thereon. The applications program more specifically includes, code segments, instructions and criteria for carrying out or performing the functions of the detection portion and/or the reporting portion as descried hereinabove. For example, such an microprocessor and applications program receive signal inputs representative of the operation status of the ignition switch and from the vibration sensor and determine from such inputs if the vehicle engine is idling or not and if idling, whether the idling is longer than a desired period of time.

Other aspects and embodiments of the invention are discussed below.

DEFINITIONS

The instant invention is most clearly understood with reference to the following definitions:

As used in the specification and claims, the singular form "a", "an" and "the" include plural references unless the context clearly dictates otherwise.

As used herein, the term "comprising" or "including" is intended to mean that the compositions, methods, devices, apparatuses and systems include the recited elements, but do not exclude other elements. "Consisting essentially of", when used to define compositions, devices, apparatuses, systems, and methods, shall mean excluding other elements of any essential significance to the combination. Embodiments defined by each of these transition terms are within the scope of this invention.

A computer readable medium shall be understood to mean any article of manufacture that contains data that can be read by a computer. Such computer readable media or non-transitory computer readable media include but is not limited to magnetic media, such as a floppy disk, a flexible disk, a hard disk, reel-to-reel tape, cartridge tape, cassette tape or cards; optical media such as CD-ROM and writeable compact disc; magneto-optical media in disc, and/or tape or card form; paper media, such as punched cards and paper tape.

USP shall be understood to mean U.S. Patent Number, namely a U.S. patent granted by the U.S. Patent and Trademark Office. Also, U.S. Pub. No. shall be understood to mean U.S. Patent Application Publication Number, namely the publication by the U.S. Patent and Trademark Office of a U.S. patent application.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

Figure 1:
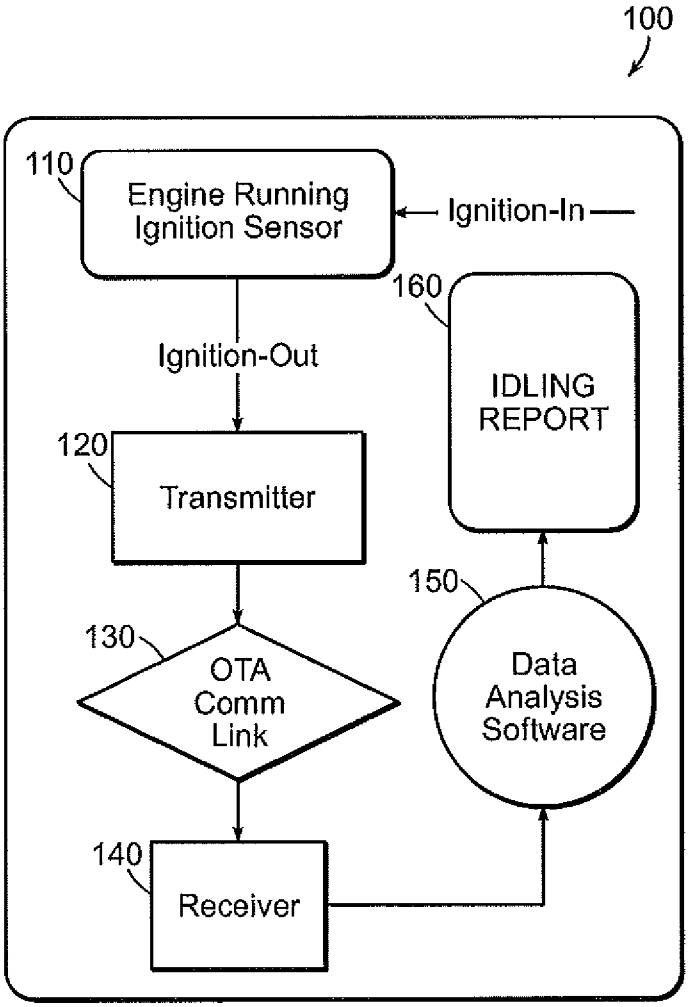
FIG. 1 is a block diagram of a detection and reporting system according to the present invention.
Figure 2:
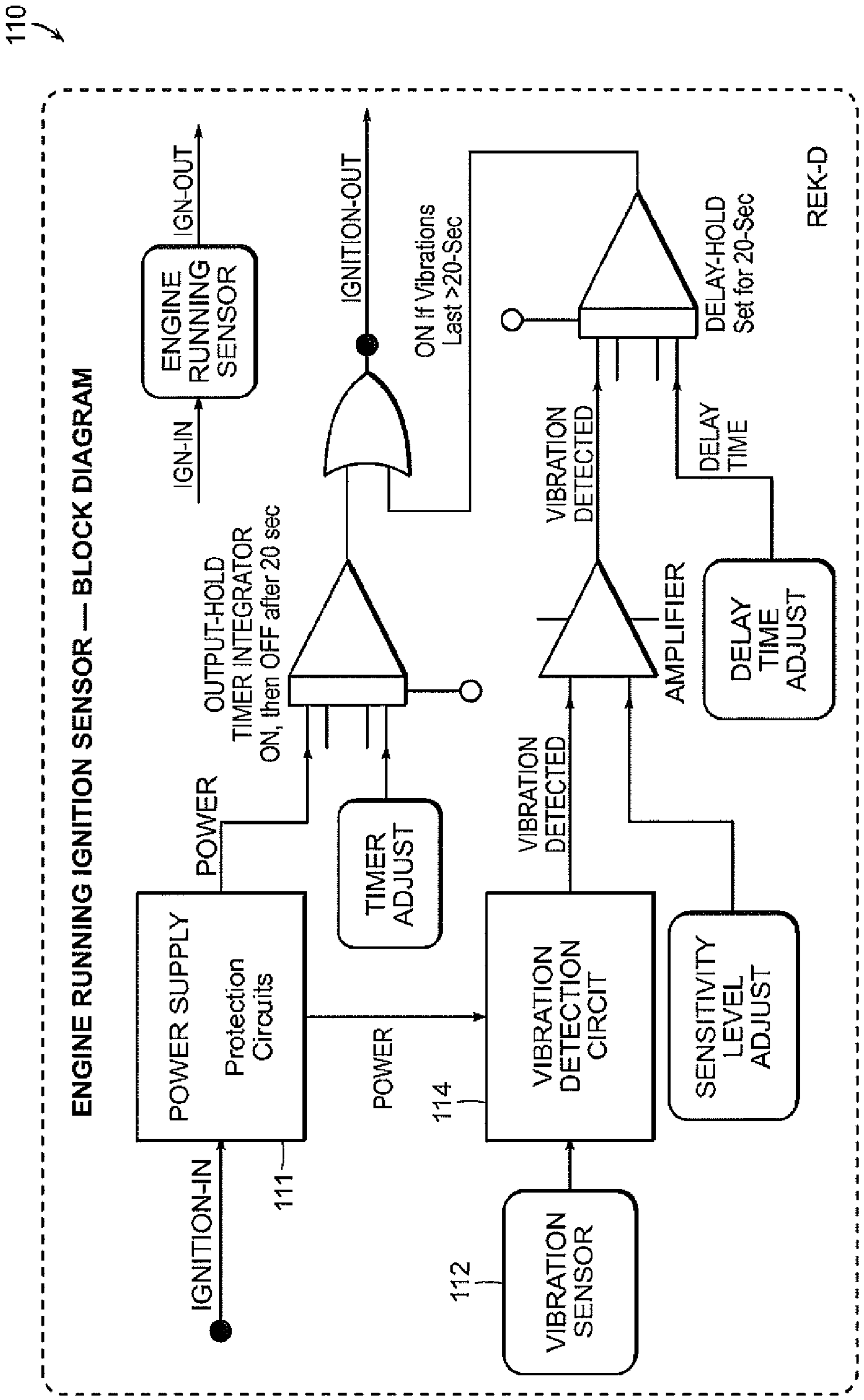
FIG. 2 is a block diagram of an engine running ignition sensing device according to the present invention.

Referring now to the various figures of the drawing wherein like reference characters refer to like parts, there is shown in FIG. 1 a block diagram of a detection and reporting system 100 according to the present invention for detecting and reporting idling of a vehicle engine. Also shown in FIG. 2 is a block diagram of the engine running ignition detector 110 or sensor thereof and a state machine for such an engine running ignition detector 110 is provided in FIG. 3.

Such a detection and reporting system 100 of the present invention can accurately report idling of a vehicle, while at the same time, minimizing the hardware costs of providing this information. Such a detection and reporting system advantageously allows a fleet operator or a business owner having one or more vehicles to efficiently manage their vehicle fleet such as by minimizing fuel consumption and engine emissions resulting from vehicle idling. Such a detection and reporting system also provides a mechanism by which the fleet operator or business owner can independently assess whether vehicle operation complied with local ordnances restrict idling of vehicles. Such a system also provides a mechanism for determining a driver's compliance with instructions, guidelines or standards for minimizing undesirable engine idling.

Such a detection and reporting system 100 includes a detection portion, a communications portion and a reporting portion all of which cooperate to detect and report engine idling for a vehicle. As described further herein, the detection portion detects or senses the presence of voltage from the vehicle's ignition switch and a mechanical property that can be associated with a running engine (e.g., vehicle's mechanical vibration). The detection portion also can include a mechanism for filtering out transients (e.g., transient vibrations) which are not related to engine running and which could mask or provide an incorrect sensing output. The detection portion forwards signal or information relating to engine running and vehicle movement via the communications portion to the reporting portion. The reporting portion (e.g., a software application being executed on a computer 150 or microprocessor) determines from the forwarded information if the vehicle engine is idling and if so, if there is excessive idling.

More particularly, such a detection and reporting system 100 includes an engine running ignition sensor or engine running ignition detector 110 or engine running ignition sensor, a transmitter 120, a communications link 130 (e.g., an OTA communication link) or communications network, a receiver 140, and a computer 150, server or other digital processing device on which is executed a data analysis software application which determines if there is excessive idling and that can output or provide an idling report 160 (e.g., in hard copy or electronic form).

The transmitter 120, communication link 130 and receiver 140 are any of a number of devices known in the art, whereby information relating to vehicle location and idling can be communicated from the engine running ignition detector 110 to the computer 150. These components make up the communications portion.

In particular exemplary embodiments, the transmitter 120 embodies wireless communication technology whereby the transmitted information is wirelessly communicated to the communications link 130. The information is thereafter communicated using any of a number of communications techniques (e.g., wireless, wired, IR communication techniques) from the link 130 to the receiver 140. In one embodiment, such wireless communications occur under certain circumstances (e.g., when vehicle is not moving and engine is operating) and at predetermined time intervals while the vehicle is being operated remotely from the reporting portion, so that determinations of excessive idling by the reporting portion are done in near real time.

In another embodiment, the engine running detection portion 110 is configured to store such information relating to idling of the vehicle until the vehicle returns to a reporting location or at some other location. For example, the engine running detection portion 110 includes any one of a number of storage device that can store such information for communication at a later time. In an exemplary embodiment, when the vehicle is at the reporting location, the engine running detection portion 110 is operated to communicate such information at that time so it can be forwarded onto the computer 150 for processing.

The present invention can provide such detection and reporting functions in connection with new installations on vehicles as well as being easily adaptable for retrofitting or back fitting into existing installations, particularly for existing applications that can sense ignition voltage. While the following discussion describes the detection and reporting system 100 in connection with vehicle engines, this shall not be limiting as it is contemplated and thus, is within the scope of the present to adapt the present invention for use with any engine or equipment that can provide one ore more, two or more or a plurality of different or separate indications of engine operation one of such indications being representative of a property (e.g., mechanical property such as vibration) associated with operation of the engine or equipment and which is capable of being monitored.

Also, if the engine or equipment being monitored does not exhibit a mechanical property it is within the scope of the present invention to utilize another property associated with engine or equipment operation and that is detectable. For example, a thermal sensor sensing heat associated with operation of the engine or equipment, an electrical sensor sensing voltage or current used by the equipment or engine, an optical sensor used to detect rotational motion of the engine or equipment and the like.

Figure 4:
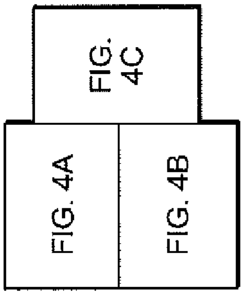
FIG. 4 is an illustrative circuit diagram of an engine running ignition sensor of the present invention including circuit details of the ignition input section, the vibration detector section and the output combiner section.
Figure 4A:
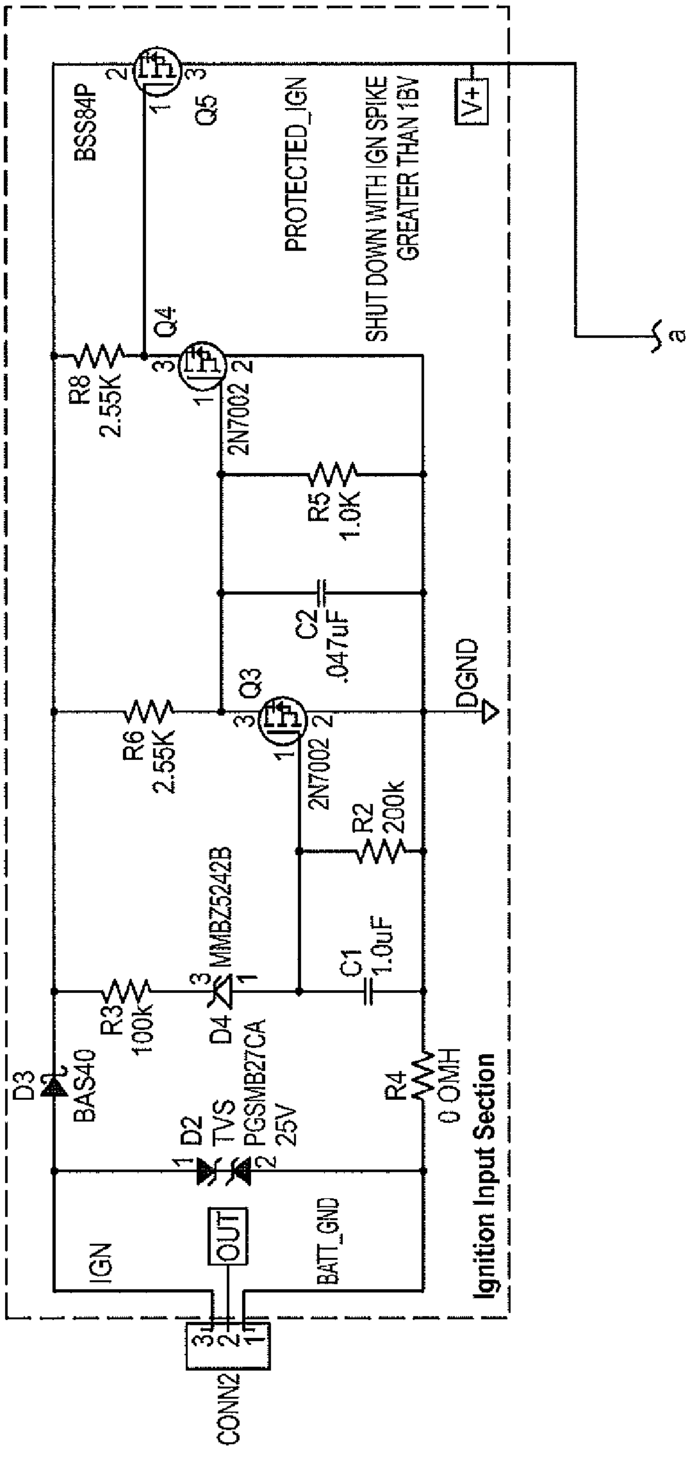
Figure 4B:
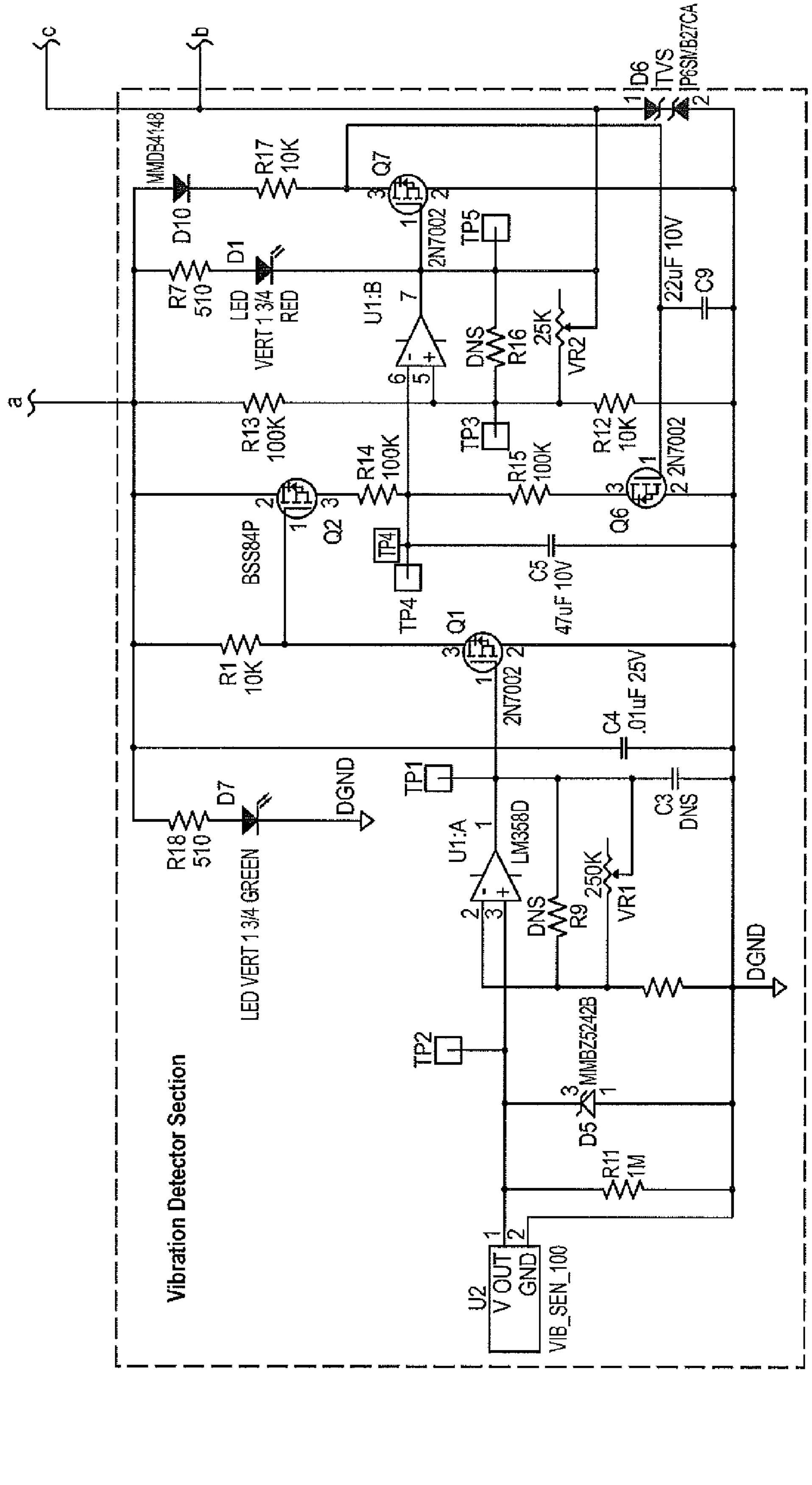
Figure 4C:
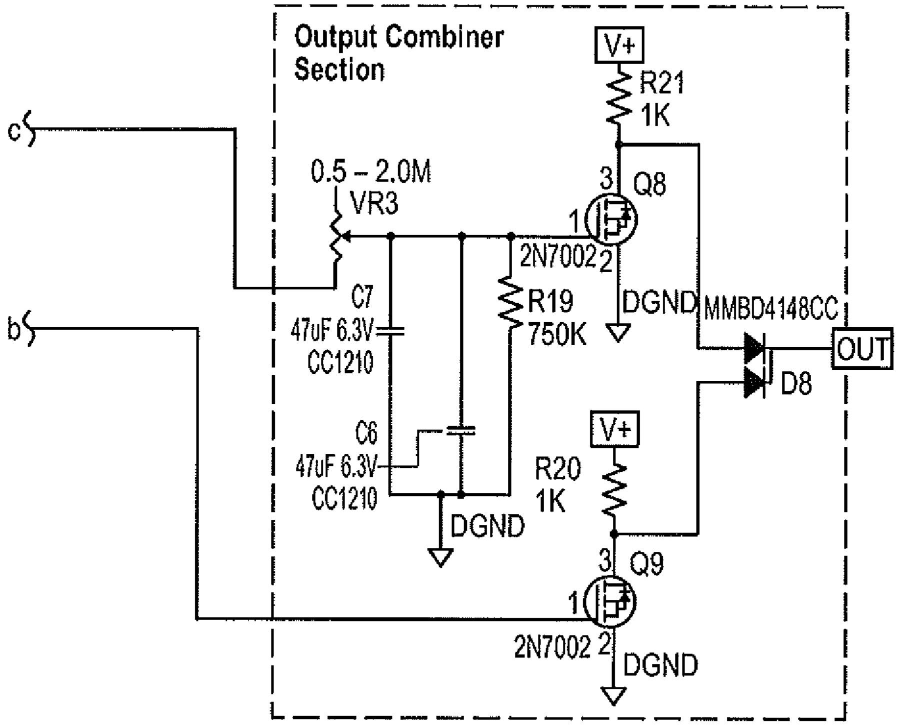

The following provides a general description as to the circuitry and operation of the engine running detection portion 110 as well as the reporting portion of the present invention. Reference also should be made to FIG. 4 which provides an illustrative circuit diagram of an engine running ignition sensor or engine running detection portion 110 of the present invention including circuit details of an ignition input section, a vibration detector section and an output combiner section. Also, in the following discussion, the following terms shall be understood to mean or be defined to mean as described below:

V+ is equal to approximately 12 Volts DC.

DGND is equal to approximately zero {0} Volts DC.

Battery voltage is nominally 12 Volts DC.

Ignition-Out-ON is the output of the sensor in the ON state (~V+)

Ignition-Out-OFF is the output of the sensor in the OFF state (~DGND)

ON indicates that the transistor is conducting current flow

OFF indicates that the transistor is NOT conducting current flow

Input and Initial Ignition Sense

When the Ignition switch of the vehicle is initially turned to the ON position (~Battery voltage), the Engine Running Ignition detection portion Sensor is enabled. In exemplary embodiments, the input circuit protects the detection portion from any voltages greater than ~18 VDC or less than zero (0) VDC. With normal battery voltage (~12 VDC) the transistor [Q5] is ON and the sensor is enabled by supplying voltage V+. If the input voltage to the sensor on a pin of Conn2 is greater than ~18V, transistor [Q3] turns ON and turns OFF transistor [Q5] disabling the detection portion by shutting off voltage V+. The set point for the protection is controlled by zenier diode D4. In a particular embodiment, the protection set value is equal to the zenier voltage plus approximately 4 volts.

Then, an immediate Ignition-Out-ON signal is generated at the output of the detection portion (Ignition-Out). This signal is an output voltage on another pin of Conn2. It is a positive voltage approximately equal to V+. This output signal will remain at V+ for the duration of the Ignition-Out-ON delay timer [Q8]. The delay time is set by the time constant of capacitors [C6 and C7] and the adjustable resistor [VR3].

Vibration Detector

In illustrative embodiments of the present invention, the vibration detector includes a vibration sensor 112 and a vibration detection circuit 114. In particular exemplary embodiments, the vibration sensor 112 is a piezoelectric detector [U2] that can sense vibration and provide an output signal thereof. The output of the piezoelectric detector is amplified using a variable gain Operational Amplifier (OpAmp) [U1: A]. The amplification gain is set by adjusting resistor [VR1]. The gain setting of this OpAmp sets the sensitivity of the detection.

The amplified signal is connected to the gate of an output switch [Q1]. This filters the oscillating signal so that only the positive cycle of the signal is used. The output switch [Q1] controls the voltage follower circuit [Q2] to generate current pulses to charge the integration capacitor [C5]. As long as vibration is being detected and amplified, the integration capacitor will be slowly charged. The rate of charge is determined by the frequency of the detected vibrations. The amount of charge during each positive cycle is controlled by the difference between V+ and the voltage on the integration capacitor [C5] divided by the resistance [R14].

If the vibration stops, the detection amplifier no longer generates pulses, and the output switch [Q1] disables the voltage follower and the integration capacitor charging current pulses stops. With NO integration capacitor charging pulse, the integration capacitor will slowly discharge. The discharge rate is controlled by the inherent leakage of the capacitor, the leakage of Q6 and the input bias current of the Schmitt Trigger OpAmp [U1:B].

The integration capacitor [C5] is connected to the inverting input of a variable Hysteresis Schmitt Trigger OpAmp [U1:B]. This amplifier is adjustable so that the positive and negative going voltage changes have different threshold levels. The Positive threshold detects the time when the rising voltage of the integration capacitor gets to the predetermined value. The Negative threshold detects the time when the falling voltage of the integration Capacitor gets to the predetermined value.

The values of the positive and negative thresholds are set by the feedback resistor [VR2] of the Schmitt Trigger OpAmp [U1:B]. The positive threshold sets the amount of Ignition-Out-ON delay time before the device will generate an Ignition-Out-ON signal. The negative threshold sets the amount of Ignition-Out-OFF delay time before the device will generate the Ignition-Out-OFF signal.

With detected vibrations, pulses from the transistor Q2 provide charge to the integration capacitor [C5] gradually increasing the voltage on the inverting input of the Schmitt Trigger OpAmp [pin 6 of U1:B]. The output of this OpAmp is logically High (equal to voltage V+), and the output switch transistor [Q7] is ON. This turns OFF transistor [Q6] disabling the integration capacitor discharge resistor [R15]. When this voltage is equal to the positive threshold of the Schmitt Trigger OpAmp [U1:B], the output changes to a logical LOW (equal to voltage DGND {0 volts}). This will turn off the switch [Q7] and turn ON transistor [Q6] and enables the integration capacitor discharge through resistor [R15]. The voltage on the input to the Schmitt Trigger OpAmp will fall to ~one half of voltage V+. This voltage will maintain the Schmitt trigger OpAmp in the logical Low condition and keeping OFF transistor [Q9] and generating an Ignition-Out-ON at the output of the sensor as long as the vibrations continue.

When the vibrations stop, the integration capacitor charging transistor [Q2] turns OFF and no charging pulses are generated. The integration capacitor discharge resistor [R15] will slowly discharge the integration capacitor [C5] and the voltage on the input to the Schmitt Trigger OpAmp will fall. When the integration capacitor [C5] is equal to the Negative Threshold voltage, the Schmitt Trigger OpAmp output will go to a logical High and turn off the switch [Q7] and switch [Q6] thereby disabling the integration capacitor discharge resistor [R15]. It also turns on transistor [Q9] and generates an Ignition-Out-OFF signal on the output of the sensor. Both rise time and fall times are critical to the operation of the sensor.

The ON signal delay time will filter out any routine and normal random vibrations, such as riders board the bus, and prevent sending false Ignition-Out-ON signals. The vibration must be continuous for the set delay time. Random short term pauses in vibration will extend the delay time. The OFF signal delay time will prevent routine and normal random loss of vibration detection from sending false Ignition-Out-OFF signals. Vibrations must stop for the delay time. Random short term vibrations will extend the delay time.

The output transistor [Q8] of the initial ignition ON detector is combined thru a diode OR circuit element [D8] with the output of the vibration sensor output switch [Q9] to provide a single output that is sent to the communication transmitter. The output will have either of two voltages: (a) a High voltage (~equal to V+) is defined as Ignition-Out-ON or (b) a Low voltage (~equal to zero {0} volts) is defined as Ignition-Out-OFF.

As to message generation and interpretation, the transmitter 120 sends messages to the computer 150, more particularly the receiving software executed therein, based on the output of the engine running ignition detection portion 110, and other normal inputs. These normal inputs typically include Latitude, Longitude and precision date/time generated by a Global Positioning Satellite (GPS) receiver and the Ignition condition (Ignition-Out-ON or Ignition-Out-OFF). In this regard, the detection portion 110 of the present invention further includes a movement portion which movement portion embodies a GPS receiver as is known to those skilled in the art and related circuitry so as to provide the above-described inputs from the GPS for transmission. These inputs are processed to develop a vehicle direction and speed message. These messages are sent periodically such as for example about every 10-30 seconds.

The receiving software uses the various messages to determine if the vehicle is moving or not as reported by the GPS system. If the vehicle is not moving, and the Ignition condition message is Ignition-Out-ON, then the vehicle is idling (engine running). If the vehicle is not moving, and the ignition condition message is Ignition-Out-OFF, then the vehicle is parked with the engine off.

Figure 3:
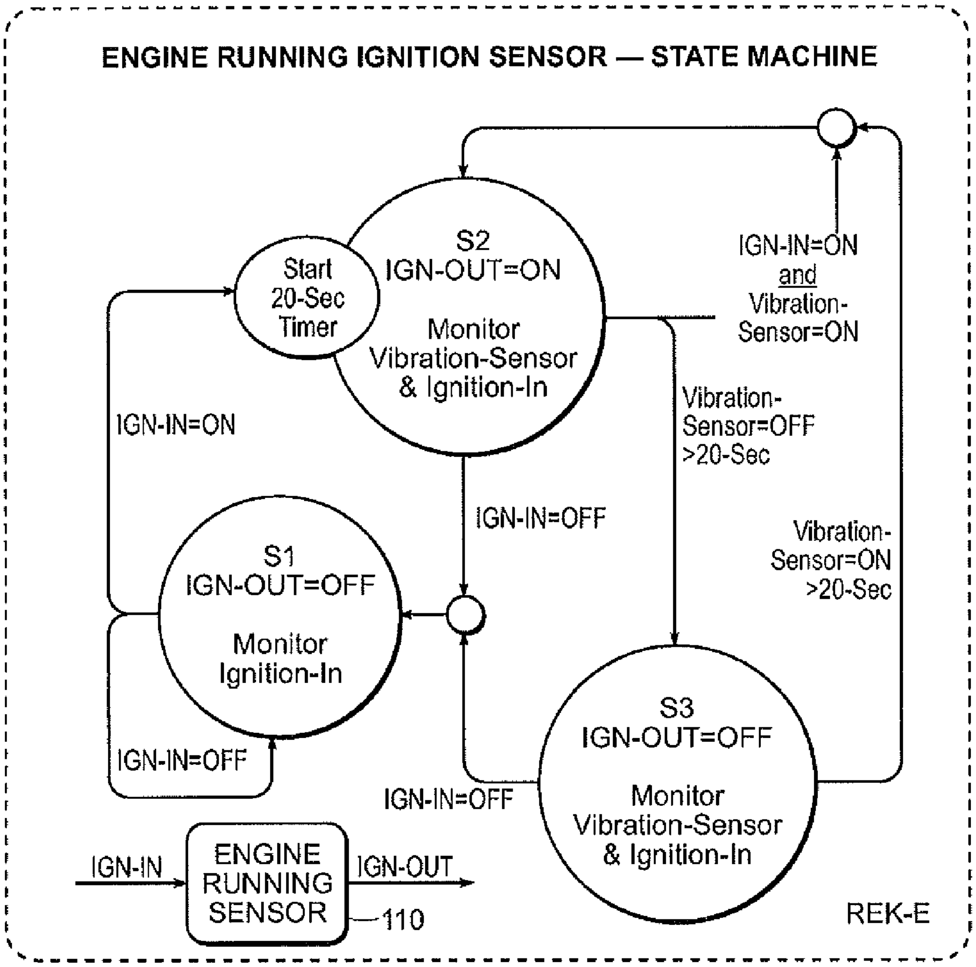
FIG. 3 is a state machine of the engine running ignition sensor circuit.

The following provides a state operating description that should be read in conjunction with FIG. 3.

State S1:

When entering State S1, the Ignition-Out signal is turned OFF.

During State S1, Monitor Ignition-In and if Ignition-In remains OFF, hold the Ignition-Out signal OFF, and the device stays in State S1.

When leaving State S1, if Ignition-In signal goes ON, State S1 terminates and State S2 is entered.

State S2

When entering State S2, the Ignition-Out signal is turned ON and a timer is started, and will run for a specified duration. This timer is adjustable.

During State S2, monitor the Ignition-In signal and the Vibration Sensor. If continuous vibrations are detected after the timer expires, and Ignition-In signal remains ON, the Ignition-Out signal is held ON and the device remains in State S2.

When exiting State S2, if continuous vibrations are not detected after the timer expires, the Ignition-Out signal goes OFF, and State S3 is entered. If Ignition-In goes OFF, Ignition-Out signal is turned OFF, and State S1 is entered.

State S3

When entering State S3, the Ignition-Out signal is turned OFF. Prepare to start a timer to detect the duration of the Vibration Sensor if or when it begins to detect continuous vibrations.

During State S3, monitor Ignition-In signal and the vibration sensor. If continuous vibrations begin, time their duration. If the Vibration Sensor remains OFF, and the Ignition-In signal remains ON, stay in State S3.

When exiting State S3, if the Vibration Sensor timer has been ON for the time period, exit to State S2. If the Ignition-Input goes OFF, exit to State S1.

The present invention is particularly advantageous in a number of respects. In the present invention the Ignition-In signal is modified to generate the Ignition-Out signal, using a vibration detector, which in-turn is used to generate messages that define the Engine Idling state.

The circuit may be implemented in other ways to accomplish the same results. Some examples of alternate circuit methods such as follows. Other forms of vibration detectors can be use in place of the piezoelectric sensor. These detectors can be vibrating reed, ball contact, or similar devices which have a make/break switching function on sensed vibration.

The circuit is reconfigurable so that the inverting input of the detector amplifier is used. This will enable functions that use the negative cycle output to generate the integration charges. Other circuit elements such as Q2 would also need to be changed.

The output polarity can be reversed by changing the type of transistor at Q8 and Q9 from N-channel FET to a P-channel FET.

Bi-polar junction transistors can be substituted for the FET devices, but adjustment in resistor values will be required to compensate for the base current requirements of bi-polar junction devices.

It also is within the scope of the present invention to implement the variously described circuits embodying electrical components using digital circuits. In this regard, those skilled in the art will appreciate that the operational descriptions and state figures provided herein illustrate the structures of the computer program code elements, including logic circuits on an integrated circuit, that function according to the present inventions. As such, the present inventions are practiced in its essential embodiments by a machine component that renders the program code elements in a form that instructs a digital processing apparatus (e.g., computer) to perform a sequence of function step(s) corresponding to the operational descriptions and state figures provided herein. Such computer program software can be executed on a computer, digital signal processor or microprocessor.

Figure 5:
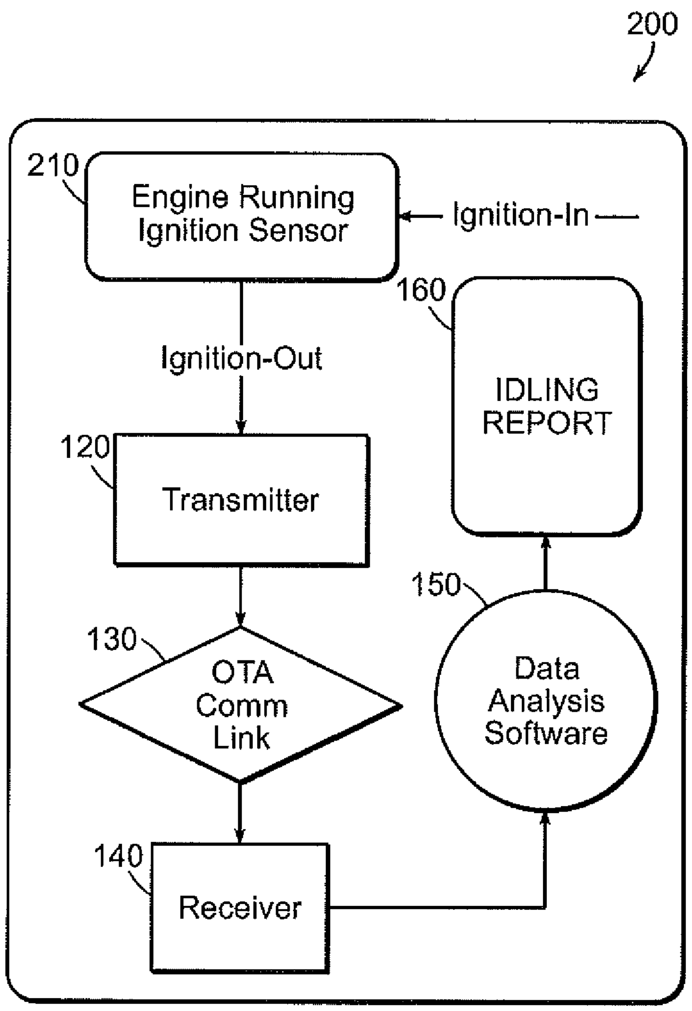
FIG. 5 is a block diagram of a detection and reporting system according to another aspect and/or embodiment of the present invention for detecting and reporting idling of a vehicle engine.
Figure 6:
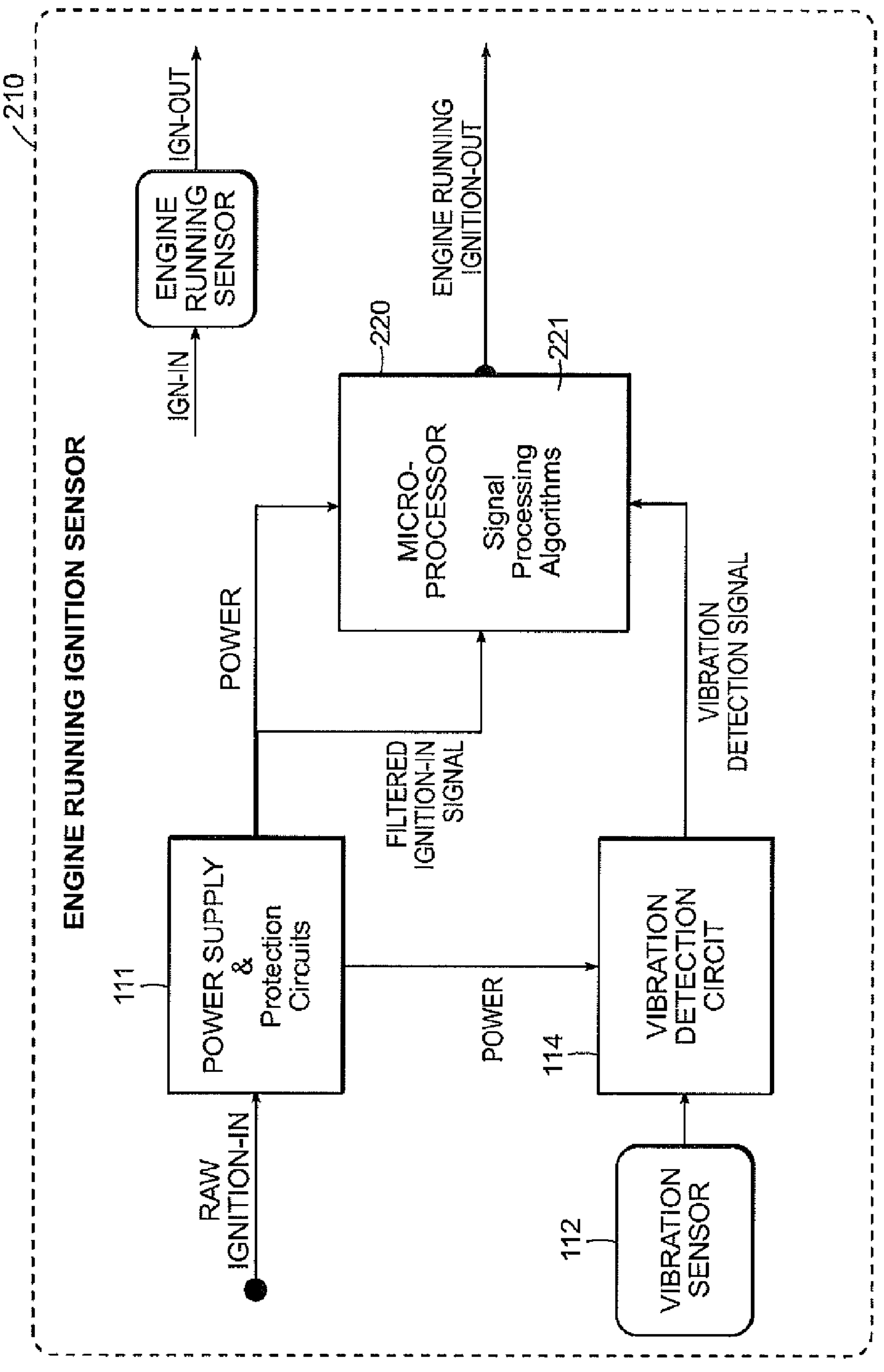
FIG. 6 is a block diagram of an engine running ignition sensing device according another aspect and/or embodiment of the present invention, such as for use in the system of FIG. 5.

Referring now to FIGS. 5 and 6 there are shown a block diagram of a detection and reporting system 200 according to another aspect/embodiment of the present invention for detecting and reporting idling of a vehicle engine (FIG. 5) and a block diagram of the engine running ignition detector 210 or sensor thereof (FIG. 6) Reference shall be made to the foregoing discussion for the detection and reporting system 100 shown in FIG. 1 for details of those components common to both aspects/embodiments of the present invention and having a common reference numeral or identifier. Also reference should be made to the state machine as provided in FIG. 3 which also applies to the engine running ignition detector 210 of this aspect/embodiment of the present invention.

Such an engine running ignition detector 210 or sensor thereof includes or comprises a power supply and protection circuits 111, a vibration detector including a vibration sensor 112 and a vibration detection circuit 114 a microprocessor 220. The power supply and protection circuits 111 provide power to the various functionalities of the engine running detector 210. The power supply and protection circuits 111 also provide a signal (e.g., a filtered signal) to the microprocessor 220 that is representative of the Ignition—In signal.

The vibration sensor 112 and vibration detection circuitry 114 is as described above and thus is not repeated herein. The vibration detection circuitry outputs a vibration detection signal to the microprocessor 220. The microprocessor 220 processes these two inputs and provides an engine running/ignition-out signal such as that described above.

The following provides a state operating description relating to the a detection and reporting system 200 according to this aspect/embodiment of the present invention and which should be read in conjunction with FIG. 3.

State S1:

When entering State S1, the Ignition-Out signal is turned OFF.

During State S1, the microprocessor monitors Ignition-In and if Ignition-In remains OFF, it causes the Ignition-Out signal OFF to be held, and the device stays in State S1.

When leaving State S1, if the Ignition-In signal goes ON, the microprocessor causes State S1 to be terminated and State S2 is entered.

State S2

When entering State S2, the Ignition-Out signal is turned ON and the microprocessor starts a timer (e.g., using its clock or clock signals), and let it run for a specified duration. This timer is adjustable.

During State S2, the microprocessor monitors the Ignition-In signal and the Vibration Sensor. If the microprocessor determines that continuous vibrations are detected after the timer expires, and the Ignition-In signal remains ON; the Ignition-Out signal is held ON by the microprocessor and the device remains in State S2.

When exiting State S2, if continuous vibrations are not detected after the timer expires, the microprocessor causes the Ignition-Out signal to go OFF, and State S3 is entered. If Ignition-In goes OFF, then the microprocessor causes the Ignition-Out signal to be turned OFF, and State S1 is entered.

State S3

When entering State S3, the Ignition-Out signal is turned OFF. The microprocessor prepares to start a timer to detect the duration of the Vibration Sensor if or when it begins to detect continuous vibrations.

During State S3, the microprocessor monitors the Ignition-In signal and the vibration sensor. If continuous vibrations begin, the microprocessor starts a process to time their duration. If the Vibration Sensor remains OFF, and the Ignition-In signal remains ON, the microprocessor stays in State S3.

When exiting State S3, if the Vibration Sensor timer has been ON for the time period, exit to State S2. If the Ignition-Input goes OFF, exit to State S1.

The microprocessor 220 and an applications program(s) or algorithms 221 being executed on such a microprocessor, are such as to perform the functions described herein and hereinabove and with the functions of the engine running ignition detector 210 or detection portion 210 of the present invention. In this regard, those skilled in the art will appreciate that the operational descriptions and state figures provided herein illustrate the structures of the computer program code elements, including logic circuits on an integrated circuit, that function according to the present inventions. As such, the present inventions are practiced in its essential embodiments by a machine component that renders the program code elements in a form that instructs the microprocessor to perform a sequence of function step(s) corresponding to the operational descriptions and state figures provided herein.

Such a micro-processor 220 includes any of a number of microprocessors such as those manufactured by Intel or AMD, Motorola or the like, any of a number of digital signal processors known to those skilled in the art and Application Specific Integrated Circuits (ASIC). Such a microprocessor 220 also can include random access memory (RAM), mechanisms and structures for performing I/O operations, a storage medium such as a magnetic hard disk drive(s) or other drives (fixed or removable) for storage of data, and a device (not shown) for reading from and/or writing to a removable computer readable medium and/or readers of other types of non-volatile memory such as flash drives, jump drives or spin memory that embody one or more types of non-volatile types of memory or storage devices.

It also should be recognized that as the engine running ignition detector or detection portion 210 according to this aspect/embodiment of the present invention comprises a microprocessor 220 and an applications program(s) or algorithms 221 for execution on such a microprocessor, the detection portion 210 is configurable so as to perform functions associated with other functionalities of the a detection and reporting system 200.

For example, the application program(s) being executed on the microprocessor 220 of the engine running ignition detector 210 can further include code segments, criteria and instructions for determining if the time the engine has been idling exceed desired limits on such idling and also provide as an output (as described herein) the determined idling time(s) to the reporting portion. In addition, it is within the scope of the present invention to provide an auditory and/or visual alarm(s) to the vehicle operator when such a determination is made, warning them that the vehicle engine has been idling to long and should be turned off.

For example, in the case where the detection portion 210 includes a movement portion that embodies a GPS receiver as is known to those skilled in the art and related circuitry so as to provide inputs of Latitude, Longitude and precision date/ generated by a Global Positioning Satellite (GPS) receiver to the microprocessor 220 so that the detection portion 220 can determine vehicle direction and speed from which the microprocessor also can determine if the vehicle is or is not moving.

If the vehicle is not moving, and the Ignition condition message is Ignition-Out-ON, then the microprocessor determines that the vehicle is idling (engine running). If the vehicle is not moving, and the ignition condition message is Ignition-Out-OFF, then the microprocessor determines that the vehicle is parked with the engine off.

In the foregoing discussion reference is made to a computer 150 or computer system, such a computer/computer system comprises any number of computer systems as are known to those skilled in the art or hereinafter developed such as that more particularly described herein. Such a computer system includes a computer, a display, and one or more input device (s). The display is any of a number of devices known to those skilled in the art for displaying images responsive to outputs signals from the computer, including but not limited to cathode ray tubes (CRT), liquid crystal displays (LCDS), plasma screens and the like. It should be recognized that the signals being outputted from the computer can originate from any of a number of devices including PCI or AGP video boards or cards mounted with the housing of the computer that are operably coupled to the computer's microprocessor and the display.

The one or more input device(s) are any of a number of devices known to those skilled in the art which can be used to provide input signals to the computer for control of applications programs and other programs such as the operating system being executed within the computer. In illustrative embodiments, the input device preferably comprises a switch, a slide, a mouse, a track ball, a glide point or a joystick or other such device (e.g., a keyboard having an integrally mounted glide point or mouse) by which a user such as student can input control signals other than by means of a keyboard.

The computer typically includes a central processing unit including one or more micro-processors such as those manufactured by Intel or AMD, Motorola or the like, random access memory (RAM), mechanisms and structures for performing I/O operations, a storage medium such as a magnetic hard disk drive(s) or other drives (fixed or removable) for storage of data, operating systems or the applications or software programs of the present invention including an applications program according to the present invention(s), and a device (not shown) for reading from and/or writing to a removable computer readable medium, such as for example an optical disk reader capable of reading CDROM, DVD or optical disks and readers of other types of nonvolatile memory such as flash drives, jump drives or spin memory that embody one or more types of non-volatile types of memory or storage devices.

Such a hard disk drive is provided for purposes of booting and storing the operating system, other applications or systems that are to be executed on the computer, paging and swapping between the hard disk and the RAM and the like. In this embodiment, an applications program according to the present invention is stored in the hard drive including the programming instructions and a data portion containing the text, auditory and visual informational data being displayed as well as the historical file of such information. Such data also can be stored in a removable computer readable medium such as a CD or DVD type of media that is inserted into a device for reading and/or writing to the removable computer readable media. Such a reading/writing device is any of a number of devices known to those skilled in the art for reading from and/or writing to the particular medium on which the applications program is stored.

In an alternative embodiment, such a computer system also includes a network based computer system that includes a server, an external storage device and a network infrastructure that operably couples a plurality or more of client computer systems to the server. The client computer systems are typically configured like the above described computer system except that in use the applications program of the present invention and related data of a condition for a given individual could be found on the server 210 and such information would be temporarily onto the client computer system.

The server is any of a number of servers known to those skilled in the art that are intended to be operably connected to a network so as to operably link a plurality or more of client computers via the network to the server and thus also to the external storage device. Such a server typically includes a central processing unit including one or more microprocessors such as those manufactured by Intel or AMD, random access memory (RAM), mechanisms and structures for performing I/O operations, a storage medium such as a magnetic hard disk drive(s), and an operating system for execution on the central processing unit. The hard disk drive of the server typically is not used for storing data and the like utilized by client applications being executed on the client computers. Rather the hard disk drive(s) of the server are typically provided for purposes of booting and storing the operating system, other applications or systems that are to be executed on the server, paging and swapping between the hard disk and the RAM.

Data and the like being used in connection with the execution of client applications, such as the applications program or algorithms of the present invention and the information and/ or data related thereto, can be stored in the external storage device that is operably interconnected to the server using any of a number of techniques and related devices or cabling known to those skilled in the art. In an illustrative embodiment, such an interconnection is implemented using a small computer systems interface (SCSI) technique(s) or via a fiber optic cable or other high-speed type of interconnection.

In addition, each of the client computers includes one or more I/O ports that are operably connected to the microprocessor and which are configured and arranged for the transfer of the data and program instructions between and amongst the client computer and the server using any of a number of non-wireless techniques or wireless techniques known to those skilled in the art. Such non-wireless techniques include for example any of a number of network infrastructures known to those skilled in the art such as Ethernet, token ring, FDDI, ATM, Sonet, X.25 and Broadband.

In the case of wireless techniques, the I/O ports of the client computers are configured so as to include a transceiver as is known to those skilled in the art for wireless network transmission systems. An exemplary wireless network technique includes those systems embodying a transceiver or transmitter complying with IEEE-802.11 or other appropriate standards hereinafter developed. In each case, the transceiver operably coupled to the client computer is configured and arranged so as to establish a communications link between the client computer and a receiver or transceiver remote from the location of the client computer that is in turn operably coupled to the server. The server in turn could be coupled to the remotely located transceiver/receiver using non-wireless or wireless techniques.

In sum, the present invention embodies a number of useful features. The detection portion of the present invention can accurately detect engine-running by detecting two different parameters associated with engine running one of which is vibration in the vehicle. Such a detection portion also can filter out vibration transients which are not associated with engine vibration. Also, such a detection portion eliminates false reporting by eliminating short duration vibration transients in both the hardware sensor and the software algorithms. Also it can be easily integrated with all commercial vehicle monitoring transceivers without modification.

In addition, the systems, methods, apparatuses and devices of the present invention provide an accurate and inexpensive mechanisms to detect and report engine idling in a vehicle. Such systems, apparatuses and devices of the present invention also are particularly advantageous as they can be installed by any vehicle technician without extensive training and typically do not involve a configuration or special tools to install and should not require connection to any wiring in the vehicle other than the ignition circuit and power supply circuitry.

The reporting portion has the capability of changing unacceptable Idling Time changes without requiring a change to the detection portion that is on the vehicle.

Although a preferred embodiment of the invention has been described using specific terms, such description is for illustrative purposes only, and it is to be understood that changes and variations may be made without departing from the spirit or scope of the following claims.

INCORPORATION BY REFERENCE

All patents, published patent applications and other references disclosed herein are hereby expressly incorporated by reference in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

What is claimed is:

1. A system to detect and report engine idling in a vehicle, comprising:

a detection portion that detects two parameters associated with engine running, wherein one of the parameters being detected is a mechanical characteristic that is present when the engine is running and is not present when the engine is not running; and a reporting portion that determines from the two detected parameters if the vehicle engine is idling.

2. The system of claim 1, wherein the mechanical characteristic being detected is a mechanical vibration.

3. The system of claim 2, wherein the other characteristic being detected is presence of voltage from the vehicle's ignition switch.

4. The system of claim 1, wherein the detection portion is further configured so as to filter out vibrations not related to engine running.

5. The system of claim 1, wherein the system further includes a vehicle movement portion that provides vehicle location information to the reporting portion to determine GPS if the vehicle is moving or not moving.

6. The system of claim 1, wherein the reporting portion includes a computer and a software application program for execution on the computer, wherein the applications program includes instructions and criteria for determining if the vehicle is moving or not moving and if it is determined that the vehicle is not moving to determine if the vehicle's engine is idling.

7. The system of claim 6, wherein the software application program for execution on the computer, further includes instructions and criteria for specifying one or maximum idling parameters and for determining if the vehicle's engine is idling for more than a predetermined amount of time based on the specified one or more idling parameters.

8. The system of claim 1, wherein the detection portion includes a vibration sensor for sensing vehicle vibration.

9. The system of claim 8, wherein the detection portion further includes timing circuitry that is configured so as determine if the vibrations are continuous for at least a predetermined time.

10. An apparatus for determining if an engine of a vehicle is running; said apparatus including:

a detector that detects two parameters associated with engine running, wherein one of the parameters being detected is a mechanical characteristic that is present when the engine is running and is not present when the engine is not running; and a processor that determines from the two detected parameters if the vehicle engine is idling.

11. The apparatus of claim 10, wherein the mechanical characteristic being detected is a mechanical vibration.

12. The apparatus of claim 11, wherein the other characteristic being detected is presence of voltage from the vehicle's ignition switch.

13. The apparatus of claim 10, wherein the detection portion is further configured so as to filter out vibrations not related to engine running.

14. A method for detecting and report engine idling in a vehicle, comprising:

detecting, by a detector, two parameters associated with engine running, wherein one of the parameters being detected is a mechanical characteristic that is present when the engine is running and is not present when the engine is not running; and determining, by a processor, when the vehicle engine is idling based on the two detected parameters.

15. The apparatus of claim 14, wherein the mechanical characteristic being detected is a mechanical vibration.

16. The method of claim 14, wherein the other characteristic being detected is presence of voltage from the vehicle's ignition switch.

17. The method of claim 14, further comprising:
filtering out vibrations not related to engine running.

* * * * *